(12) United States Patent
Kobayashi et al.

(10) Patent No.: US 7,646,890 B2
(45) Date of Patent: Jan. 12, 2010

(54) IMAGE PROCESSOR FOR AUTOMOTIVE VEHICLE

(75) Inventors: Kenji Kobayashi, Obu (JP); Yukimasa Tamatsu, Okazaki (JP)

(73) Assignee: Denso Corporation, Kariya (JP)

( * ) Notice: Subject to any disclaimer, the term of this patent is extended or adjusted under 35 U.S.C. 154(b) by 717 days.

(21) Appl. No.: 11/402,591

(22) Filed: Apr. 12, 2006

(65) Prior Publication Data

US 2006/0233425 A1    Oct. 19, 2006

(30) Foreign Application Priority Data

Apr. 15, 2005    (JP) ............................. 2005-118717

(51) Int. Cl.
*G06K 9/00* (2006.01)
*H04N 7/18* (2006.01)

(52) U.S. Cl. .................... 382/106; 382/274; 348/148

(58) Field of Classification Search ............... 382/100, 382/103, 104, 106, 107, 162, 168, 181, 189, 382/199, 232, 256, 274, 276, 305, 321; 701/128; 340/435; 348/148
See application file for complete search history.

(56) References Cited

U.S. PATENT DOCUMENTS

| | | | |
|---|---|---|---|
| 5,790,403 A * | 8/1998 | Nakayama | 701/28 |
| 6,477,260 B1 * | 11/2002 | Shimomura | 382/106 |
| 6,819,779 B1 * | 11/2004 | Nichani | 382/104 |
| 7,006,667 B2 * | 2/2006 | Akutagawa | 382/104 |
| 7,038,577 B2 * | 5/2006 | Pawlicki et al. | 340/435 |
| 7,184,073 B2 * | 2/2007 | Varadarajan et al. | 348/148 |
| 7,362,883 B2 * | 4/2008 | Otsuka et al. | 382/104 |

FOREIGN PATENT DOCUMENTS

JP     11-326541    * 11/1999

* cited by examiner

*Primary Examiner*—Seyed Azarian
(74) *Attorney, Agent, or Firm*—Harness, Dickey & Pierce, PLC

(57) ABSTRACT

An image processor for an automotive vehicle includes: an imaging element for capturing an image of a road; a traffic lane line detection element for detecting a position of a traffic lane line by determining an edge of the traffic lane line; a distance distribution calculation element for calculating a distance distribution of an edge intensity corresponding to a distance to the traffic lane line from the imaging element; and a detection reliability calculation element for calculating a degree of reliability of detection of the traffic lane line on the basis of the distance distribution of the edge intensity of the traffic lane line.

13 Claims, 6 Drawing Sheets

IMAGE PROCESSOR FOR AUTOMOTIVE VEHICLE

CROSS REFERENCE TO RELATED APPLICATION

This application is based on Japanese Patent Application No. 2005-118717 filed on Apr. 15, 2005, the disclosure of which is incorporated herein by reference.

FIELD OF THE INVENTION

The present invention relates to an image processor for an automotive vehicle.

BACKGROUND OF THE INVENTION

An image processor for an automotive vehicle is disclosed in, for example, Japanese Patent No. 3444192. The processor detects a white line (i.e., a lane line) on a traffic road on the basis of an image of the road in front of an automotive vehicle. The image of the road is taken by an imaging element. On the basis of sharpness of an edge of the white line, distance distribution of unsharpness of each part of the white line is calculated. The distance distribution of unsharpness is compared with a reference distance distribution of unsharpness, which is preliminarily determined to be a reference under a predetermined reference visibility. Thus, a ratio between the detected distance distribution and the reference distance distribution is obtained as a distance distribution of a ratio of unsharpness. The distance distribution of the ratio of unsharpness is approximated with a straight line. The image processor estimates environment around the imaging element on the basis of the slope of the approximate straight line, dispersion of the distance distribution of the ratio of unsharpness with respect to the approximate straight line, time change of the approximate straight line, and average of the ratio of unsharpness.

Thus, conventionally, the imaging environment is determined on the basis of the approximate straight line, which is obtained by approximating the distance distribution of ratio of unsharpness. Therefore, visibility reduction caused by bad weather such as rain and fog is detectable by using the image processor. However, the image processor cannot determine reduction of reliability for imaging the white line. The reduction of reliability for imaging the white line is caused by a factor other than weather. Specifically, for example, there is an area, in which the white line is not visible (i.e., detectable) by the imaging element, because the area is displaced apart from the imaging element and it is in the nighttime. A part of the white line is interrupted by other vehicles and/or other bodies, so that the part of the white line is not detected by the imaging element. Thus, when the distance distribution is approximated by the straight line, the image processing device may handle as if a part of the white line, which is not actually detected by the imaging element, is captured.

SUMMARY OF THE INVENTION

In view of the above-described problem, it is an object of the present invention to provide an image processor for an automotive vehicle, the processor being capable of determining degree of reliability for a detection result of an image.

An image processor for an automotive vehicle includes: an imaging element for capturing an image of a road, on which the automotive vehicle is located; a traffic lane line detection element for detecting a position of a traffic lane line on the road by determining an edge of the traffic lane line on the basis of the image of the road; a distance distribution calculation element for calculating a distance distribution of an edge signal intensity of the traffic lane line, the distance distribution corresponding to a distance between the traffic lane line and the imaging element; and a detection reliability calculation element for calculating a degree of reliability of detection of the traffic lane line on the basis of the distance distribution of the edge signal intensity of the traffic lane line.

In the above processor, the degree of reliability of detection of the traffic lane line is determined on the basis of the distance distribution of the edge signal intensity, which is obtained without using a straight line approximation method. Thus, the reduction of the reliability caused by a factor other than weather in addition to the weather factor can be detected.

Further, an image processor for an automotive vehicle includes: an imaging element for imaging a road, on which the automotive vehicle is disposed; a traffic lane line detection element for detecting a position of a traffic lane line on the road by determining an edge of the traffic lane line on the basis of an image of the road; a distance distribution calculation element for calculating a distance distribution of a number of edge detection times of the traffic lane line detected by the traffic lane line detection element, the distance distribution corresponding to a distance between the traffic lane line and the imaging element; and a detection reliability calculation element for calculating a degree of reliability of detection of the traffic lane line on the basis of the distance distribution of the number of edge detection times.

In the above processor, the degree of reliability of detection of the traffic lane line is determined on the basis of the distance distribution of the number of edge detection times. Thus, the reduction of the reliability caused by a factor other than weather in addition to the weather factor can be detected.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
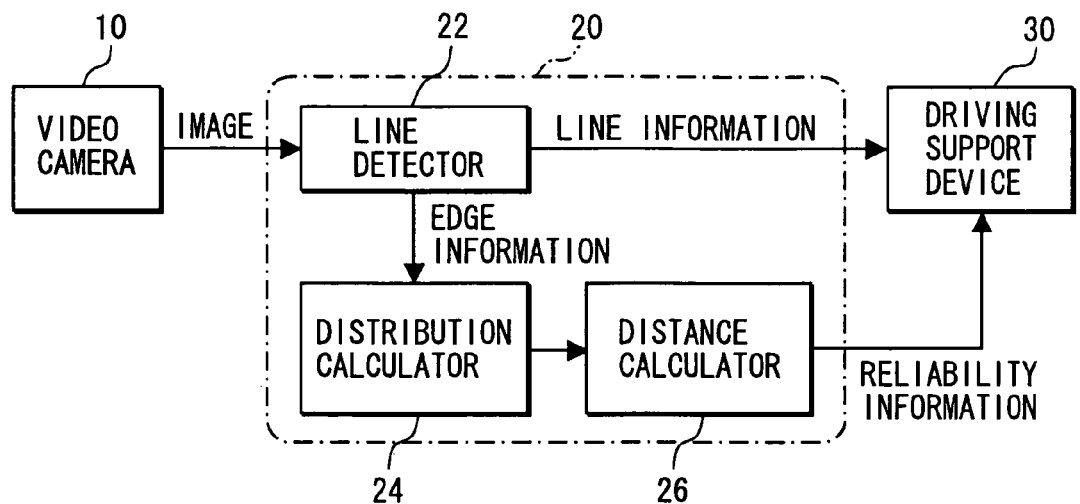
FIG. 1 is a schematic block diagram showing an image processor according to a first embodiment of the present invention.
Figure 2A:
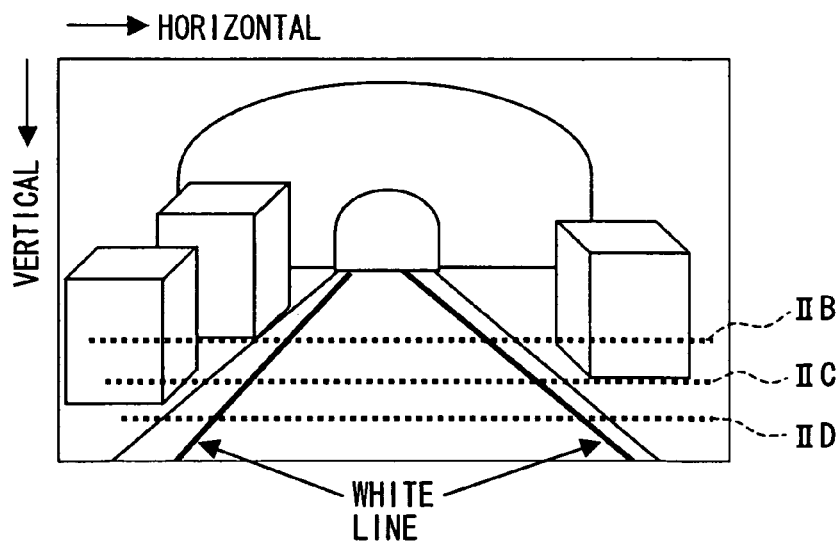
FIG. 2A is a schematic view showing a sample of an image detected by a video camera in the processor.
Figure 2B:
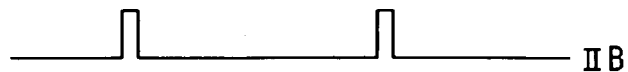
FIGS. 2B to 2D are graphs showing samples of white line detection.
Figure 2C:
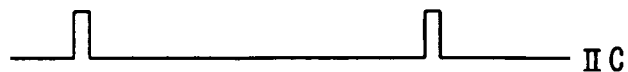
Figure 2D:
Figure 2E:
FIG. 2E is a graph showing a derivation result of the sample of white line detection in FIG. 2D, according to the first embodiment.

FIG. 1 shows an image processor including an image processing device 20 and periphery devices of the image processing device 20, according to a first embodiment of the present invention. The periphery devices include, for example, a video camera 10 as an imaging element. The video camera 10 shoots, i.e., monitors an image including a traffic road in front of an automotive vehicle. The image of the road is monitored by a predetermined time interval, for example, by thirty frames per second. Image information detected by the video camera 10 is outputted to the image processing device 20. The image information includes, for example, a picture cell data (i.e., a pixel data), which represents brightness of each picture cell detected by the video camera 10.

The image processing device 20 is provided by a micro-computer (not shown). The micro-computer includes a ROM, a RAM, a CPU, an I/O element and a bus. The bus connects among the ROM, the RAM, the CPU, and the I/O element. A predetermined program is written in the ROM, and the CPU executes the predetermined program so that the CPU performs an image processing along with the program.

The image processing device 20 includes a white line detection portion 22 as a white line detection element, a first calculation portion 24 for a distance distribution of edge signal intensity and a second calculation portion 26 for a detectable edge distance. The white line detection portion 22 detects the white line on the basis of the image information obtained by the camera 10. The white line as a traffic lane line shows a boundary of a traffic lane, i.e., a boundary of a traffic partition on the road.

For example, when the image shown in FIG. 2 and including the road in front of the vehicle is detected by the camera 10, the pixel data along with each horizontal line IIB-IID of the image is obtained. A difference between neighboring two pixel data is calculated. For example, the pixel data along with the horizontal line IID shown in FIG. 2D is differentiated so that a derivation data of the pixel data shown in FIG. 2E is obtained. Here, the neighboring two pixel data are detected by neighboring two picture cells in a horizontal direction, i.e., along with the horizontal line IIB-IID. Thus, the difference as a differential value of pixel data in the picture cell is detected as an edge signal intensity showing the intensity of the edge signal of the white line. The edge of the white line is detected as the large edge signal intensity, which is provided by two neighboring picture cells changing from a dark picture cell to a bright picture cell or changing from a bright picture cell to a dark picture cell. The bright picture cell represents the surface of the white line, and the dark picture cell represents the road surface.

The white line detection portion 22 outputs edge information to the first calculation portion 24 as an edge intensity distance distribution calculator. The edge information shows the edge signal intensity, i.e., the edge signal intensity in each horizontal line IIB-IID. Further, the white line detection portion 22 outputs white line positioning information to a driving support device 30. The white line positioning information shows a position of the white line on the road, and is obtained on the basis of the edge information.

Here, when the white line as an object to be detected is a broken line, or when the image detected by the camera 10 is distorted by environmental disturbance, the white line detection portion 22 may not detect the white line edge on a whole frame of the image, i.e., on a whole area of the image. Thus, in general, the white line detection portion 22 detects the edge information in a predetermined period so that the edge information is averaged. On the basis of the edge information processed in an averaging procedure, the position of the white line is detected.

The first calculation portion 24 as a distance distribution calculation element calculates distance distribution of the edge signal intensity of the white line on the basis of the edge information of the white line detection portion 22. The distance distribution shows a relation ship between the edge signal intensity and a distance between an object, i.e., the white line and the video camera 10, i.e., the vehicle. The distance is almost equal to a distance between the vehicle and the object. For example, when the white line edge shown in FIG. 3 is detected, the distance distribution of the edge signal intensity corresponding to the distance from the vehicle is calculated, as shown in FIGS. 4A and 4B.

Figure 3:
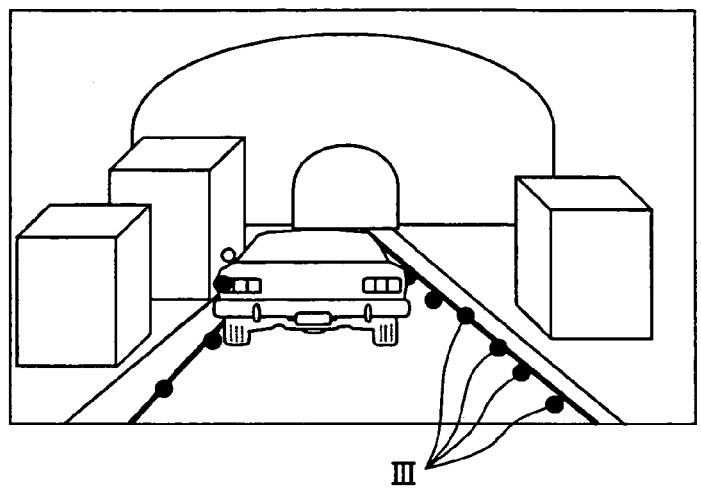
FIG. 3 is a schematic view showing a detected edge III of the white line in FIG. 2A, according to the first embodiment.
Figure 4A:
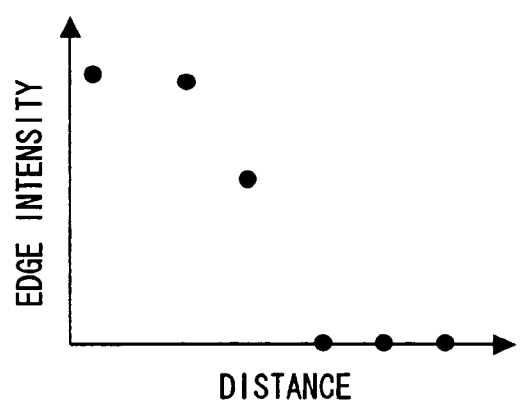
FIG. 4A is a graph showing a distance distribution of edge signal intensity of a left side white line in FIG. 3.
Figure 4B:
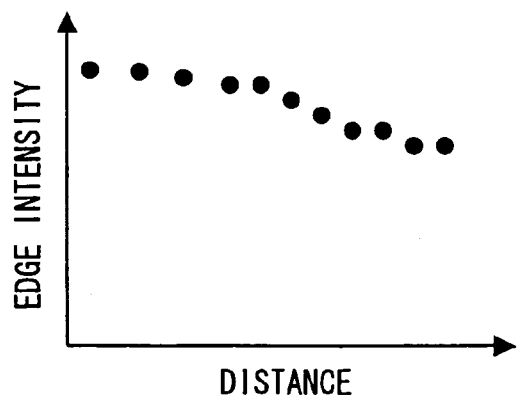
FIG. 4B is a graph showing a distance distribution of edge signal intensity of a right side white line in FIG. 3.

FIG. 4A shows the distance distribution of the edge signal intensity derived from the left side white line in FIG. 3, and FIG. 4B shows the distance distribution of the edge signal intensity derived from the right side white line in FIG. 3. The distance from the vehicle can be calculated on the basis of the position of the picture cell in the image, since an attachment position, an attachment angle and a view angle of the camera 10 are fixed, i.e., predetermined.

The second calculation portion 26 calculates a detected edge distance on the basis of the characteristics of the distance distribution of the edge signal intensity, which is calculated by the first calculation portion 24. The detected edge distance is a distance between the detected white line edge and the vehicle, i.e., the detected edge distance shows a detectable distance of the white edge from the vehicle. Thus, the detected edge distance is defined as a detectable edge distance.

Figure 5A:
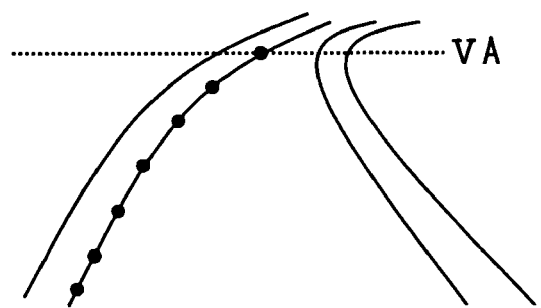
FIG. 5A is a schematic view showing a detectable edge distance VA in a case where no other vehicle exists in front of the vehicle.
Figure 5B:
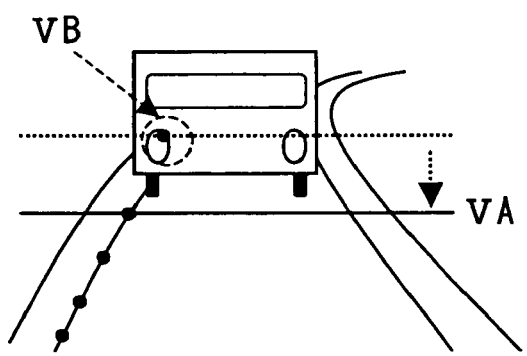
FIG. 5B is a schematic view showing an detectable edge distance VA in a case where another vehicle exists in front of the vehicle, according to the first embodiment.

For example, as shown in FIG. 5A, when no other vehicle in front of the vehicle exists on the road, the detected edge distance VA becomes longer. However, when the other vehicle exists in front of the vehicle, the detected edge distance VA, i.e., the detectable edge distance becomes shorter. This is because the white line in front of the vehicle is interrupted by the other vehicle. When the white line in front of the vehicle is interrupted by the other vehicle, the body or the like VB of the other vehicle may be detected as the white line edge by mistake. Therefore, to avoid false detection, it is necessary to eliminate the edge VB of the other vehicle.

Thus, as described above, when the white line in front of the vehicle is interrupted by the other vehicle, the distance distribution of the edge signal intensity of the white line is changed with a certain change. When the certain change is observed at a distance from the vehicle, the distance from the vehicle is defined as the detectable edge distance VA. The reliability of results of the white line detection is determined on the basis of the length of the detectable edge distance VA.

Figure 6:
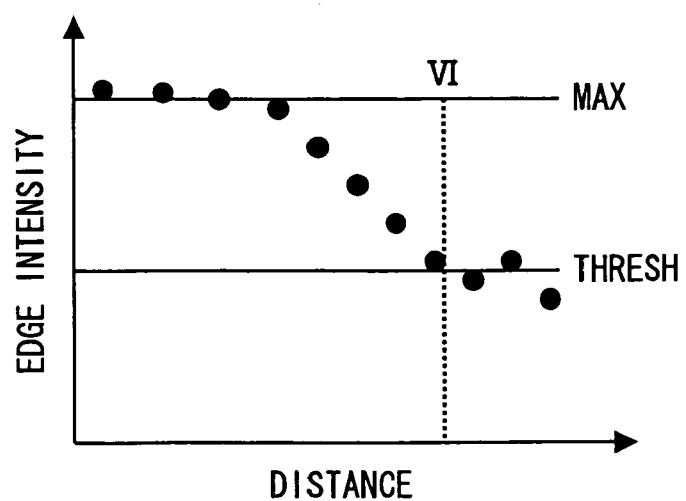
FIG. 6 is a graph explaining a method for determining a detectable edge distance VI on the basis of a threshold signal intensity THRESH, according to the first embodiment.

Specifically, FIG. 6 shows a relationship between the edge signal intensity and the distance from the vehicle. In FIG. 6, VI represents the detectable edge distance. Here, the maximum intensity MAX of the edge signal intensity in the distance distribution of the edge signal intensity is defined as a reference. A threshold intensity THRESH of the edge signal intensity is defined. For example, the intensity of the threshold intensity THRESH is a half of the maximum intensity MAX. In the distance distribution of the edge signal intensity, the detectable edge distance VI is calculated to be defined as a distance, at which the edge signal intensity becomes lower than the threshold intensity THRESH. Thus, on the basis of the maximum edge signal intensity in the distance distribution, the detectable edge distance VI is calculated.

The second calculation portion 26 as a white line detection reliability calculation element calculates the degree of reliability of the results of white line detection on the basis of the length of the detectable edge distance. For example, when the length of the detectable edge distance is large, the degree of reliability of the detection is set to be high. When the length of the detectable edge distance is small, the degree of reliability of the detection is set to be low. Thus, the degree of reliability is determined by the second calculation portion 26, and the second calculation portion 26 outputs the determined result of the degree of reliability to the driving support device 30.

The driving support device 30 as a driving support element executes a driving support such as traffic lane deviation alarm and traffic lane keeping support. Here, the traffic lane deviation alarm sends an alert to a driver of the vehicle when the vehicle deviates from the traffic lane. The traffic lane keeping support supports the driver to keep running in the traffic lane. The driving support device 30 supports the driver to drive the vehicle appropriately in accordance with the reliability of the white line detection. The traffic lane deviation alarm and the traffic lane keeping support utilize the image information from the image, so that they perform driving supports in accordance with the reliability of the image information result.

Figure 7:
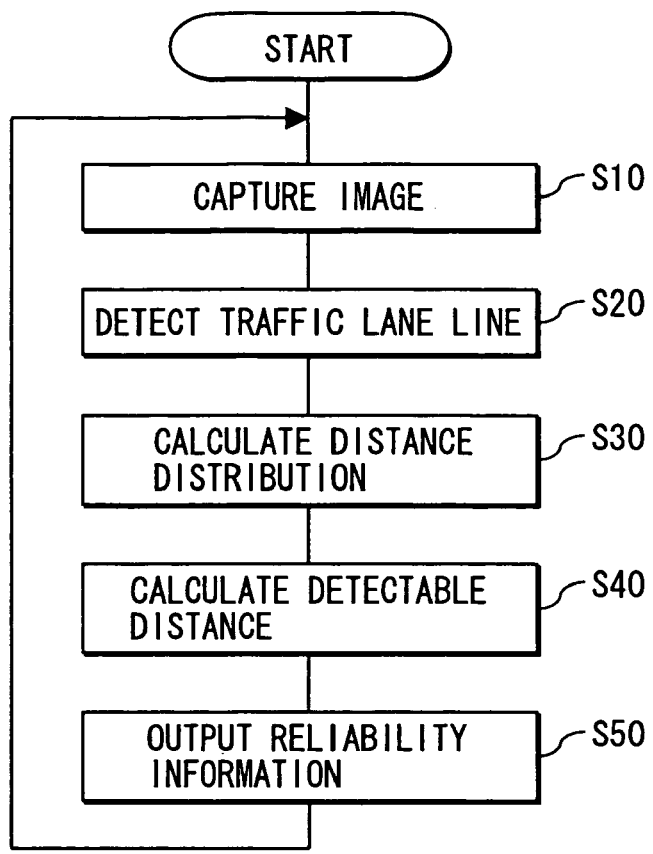
FIG. 7 is a flow chart explaining operation of an image processing device in the processor according to the first embodiment.

Operation of the image processing device 20 is explained with reference to FIG. 7. In Step S10, the image detected by the video camera 10 is inputted into the image processing device 20. In Step S20, the white line is detected on the basis of the image obtained in Step S10. In Step S30, the distance distribution of the edge signal intensity of the white line is calculated. In Step S40, the detectable edge distance is calculated. In Step S50, the degree of reliability of the white line detection results is determined on the basis of the detectable edge distance, and the information about the degree of reliability is inputted to the driving support device 30. Thus, the image processing device 20 determines the degree of reliability of the white line detection results on the basis of the distance distribution of the edge signal intensity, which is not obtained by using a linear approximation method. Thus, the reduction of reliability of the white line detection caused by a factor other than weather can be determined. The factor is provided by a case where there is an area, the white line in which is not visible, or where a part of the white line is interrupted.

Figure 8:
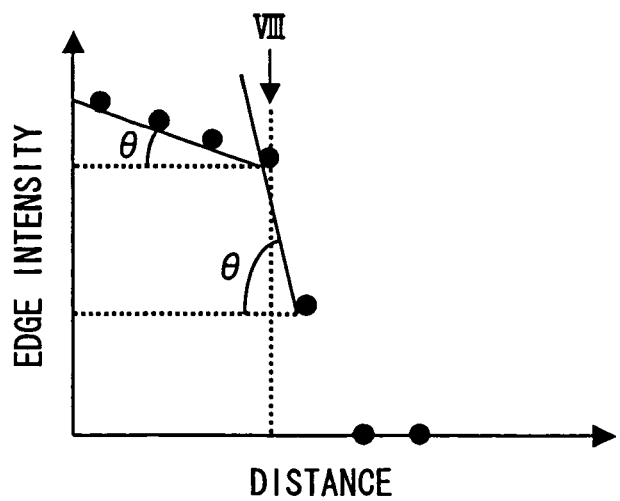
FIG. 8 is a graph explaining a method for determining a detectable edge distance VIII on the basis of a slope θ, according to a modification of the first embodiment.

Although the detectable edge distance is determined on the basis of the threshold intensity THRESH, the detectable edge distance may be determined by other ways. For example, the detectable edge distance is determined as a distance from the vehicle, at which a degree of change of the edge signal intensity in accordance with the distance from the vehicle is equal to or larger than a predetermined degree of change. Specifically, as shown in FIG. 8, a slope θ between adjacent two points of the white line edge is defined. When the slope θ is equal to or larger than a predetermined threshold slope such as a 45-degree slope, the distance from the vehicle is determined as the detectable edge distance VIII. Thus, the detectable edge distance VIII is determined on the basis of the degree of change in the edge signal intensity with reference to the distance from the vehicle.

Second Embodiment

Figure 9:
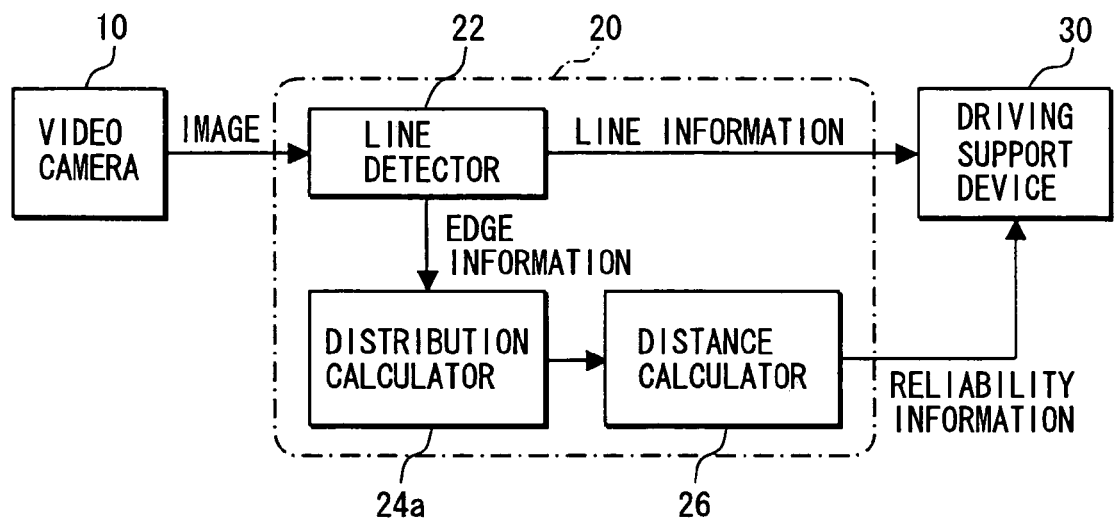
FIG. 9 is a schematic block diagram showing an image processor according to a second embodiment of the present invention.

An image processor including an image processing device 20 according to a second embodiment of the present invention is shown in FIG. 9. The device 20 further includes a third calculation portion 24a as a distance distribution calculator of the number of edge detection times. The third calculation portion 24a calculates the distance distribution with reference to the number of edge detection times. In the device 20, the number of edge detection times of the white line edge is defined, and a distance distribution of the number of edge detection times is calculated. On the basis of the distance distribution of the number of edge detection times, the degree of reliability of the white line detection results is determined. Specifically, when the white line is a dotted line, or when the image detected by the camera 10 is distorted by environmental disturbance, the white line detection portion 22 may not detect the white line edge on a whole frame of the image. Thus, in general, the white line detection portion 22 detects the edge information in a predetermined period so that the edge information is averaged. On the basis of the edge information processed in an averaging procedure, the position of the white line is detected. In this case, the white line detection portion 22 counts the number of edge detection times during a predetermined period with reference to the distance from the vehicle. The third calculation portion 24a calculates the distance distribution of the number of the detection times of the white line edge in accordance with the distance from the vehicle. The second calculation portion 26 determines the degree of reliability of the white line detection results on the basis of the distance distribution of the number of the detection times.

When the number of the edge detection times shows a certain change in accordance with the distance from the vehicle, the second calculation portion 26 calculates the detectable edge distance. Specifically, when the certain change is observed at a distance from the vehicle, the distance from the vehicle is defined as the detectable edge distance. The reliability of results of the white line detection is determined on the basis of the length of the detectable edge distance.

Figure 10:
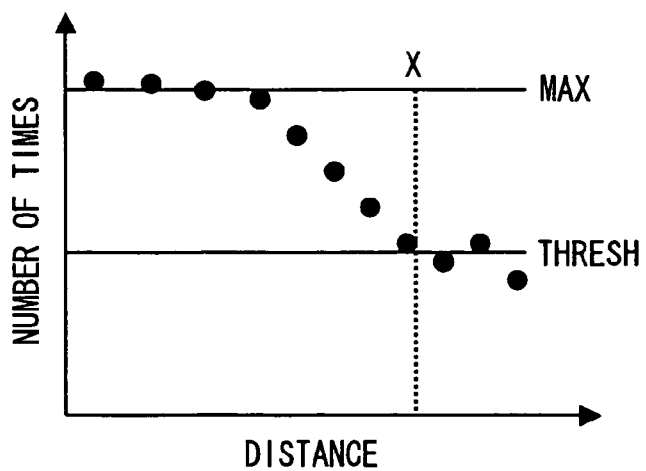
FIG. 10 is a graph explaining a method for determining a detectable edge distance X on the basis of a threshold number of detection times THRESH, according to the second embodiment.

For example, when the white line in front of the vehicle is interrupted by the other vehicle, the distance distribution of the edge detection times shows a certain change, as shown in FIG. 10. The detectable edge distance X is determined as the distance from the vehicle, at which the distance distribution shows the certain change.

Specifically, FIG. 10 shows a relationship between the number of the edge detection times and the distance from the vehicle. In FIG. 10, X represents the detectable edge distance. Here, the maximum edge detection times MAX of the edge detection times in the distance distribution of the edge detection times is defined as a reference. A threshold edge detection times THRESH of the edge detection times is defined.

For example, the number of the threshold detection times THRESH is a half of the maximum detection times MAX. In the distance distribution of the edge detection times, the detectable edge distance X is calculated as a distance, at which the number of the edge detection times becomes lower than the threshold detection times THRESH. Thus, on the basis of the maximum edge detection times in the distance distribution, the detectable edge distance X is calculated.

Figure 11:
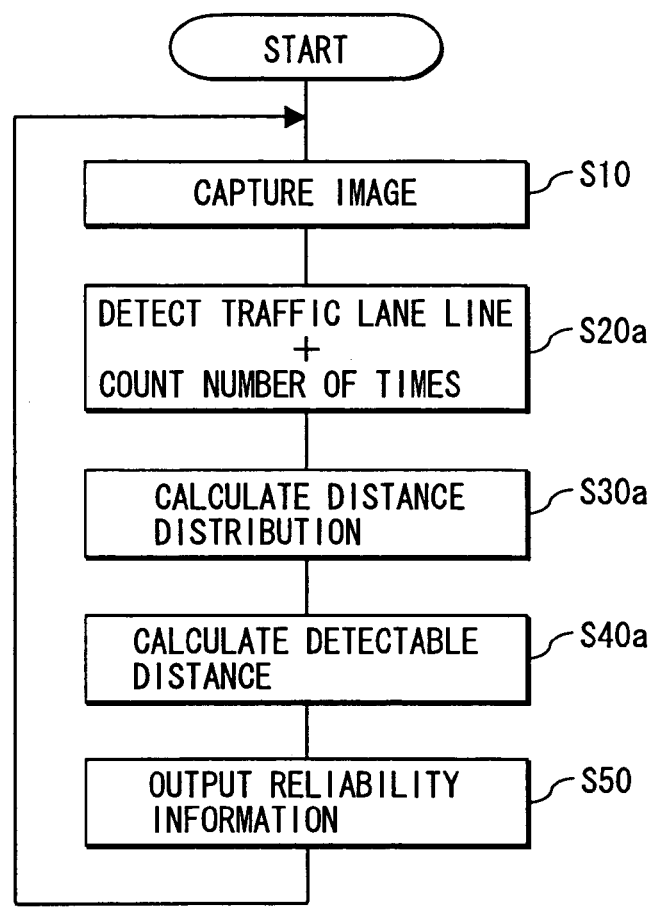
FIG. 11 is a flow chart explaining operation of an image processing device in the processor according to the second embodiment.

Operation of the image processing device 20 is explained with reference to FIG. 11. In Step S10, the image detected by the video camera 10 is inputted into the image processing device 20. In Step S20a, the white line is detected on the basis of the image obtained in Step S10. In this embodiment, the white line edge detected in a predetermined period is averaged, and the position of the white line is calculated on the basis of the averaged edge. Further, in Step S20a, the number of the edge detection times is counted. In Step S30a, the distance distribution of the edge detection times of the white line is calculated. In Step S40a, the detectable edge distance is calculated. In Step S50, the degree of reliability of the white line detection results is determined on the basis of the detectable edge distance, and the information about the degree of reliability is inputted to the driving support device 30. Thus, the image processing device 20 determines the degree of reliability of the white line detection results on the basis of the distance distribution of the edge detection times, which is not obtained by using a linear approximation method. Thus, the reduction of reliability of the white line detection caused by a factor other than weather can be determined. The factor is provided by a case where there is an area, the white line in which is not visible, or where a part of the white line is interrupted.

Figure 12:
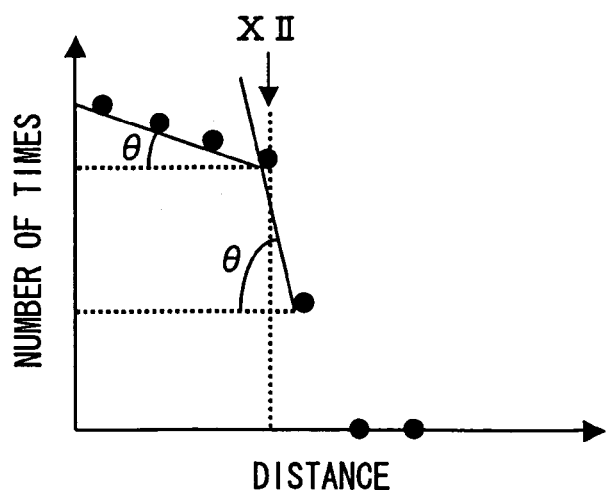
FIG. 12 is a graph explaining a method for determining a detectable edge distance XII on the basis of a slope θ, according to a modification of the second embodiment.

Although the detectable edge distance is determined on the basis of the threshold detection times THRESH, the detectable edge distance may be determined by other ways. For example, the detectable edge distance is determined as a distance from the vehicle, at which a degree of change of the edge detection times in accordance with the distance from the vehicle is equal to or larger than a predetermined degree of change. Specifically, as shown in FIG. 12, a slope θ between adjacent two points of the white line edge is defined. When the slope θ is equal to or larger than a predetermined threshold slope such as a 45-degree slope, the distance from the vehicle is determined as the detectable edge distance. Thus, the detectable edge distance is determined on the basis of the degree of change in the edge detection times with reference to the distance from the vehicle.

The present inventions have the following aspects.

An image processor for an automotive vehicle includes: an imaging element for capturing an image of a road, on which the automotive vehicle is located; a traffic lane line detection element for detecting a position of a traffic lane line on the road by determining an edge of the traffic lane line on the basis of the image of the road; a distance distribution calculation element for calculating a distance distribution of an edge signal intensity of the traffic lane line, the distance distribution corresponding to a distance between the traffic lane line and the imaging element; and a detection reliability calculation element for calculating a degree of reliability of detection of the traffic lane line on the basis of the distance distribution of the edge signal intensity of the traffic lane line.

In the above processor, the degree of reliability of detection of the traffic lane line is determined on the basis of the distance distribution of the edge signal intensity, which is obtained without using a straight line approximation method. Thus, the reduction of the reliability caused by a factor other than weather in addition to the weather factor can be detected.

Alternatively, the detection reliability calculation element may include a detectable edge distance calculation element for calculating a detectable edge distance between the traffic lane line and the imaging element. The detectable edge distance is defined as a distance, at which the edge signal intensity in the distance distribution shows a certain change. The detection reliability calculation element determines the degree of reliability of detection of the traffic lane line on the basis of a length of the detectable edge distance.

Alternatively, the detectable edge distance calculation element may determine the detectable edge distance, at which the edge signal intensity is equal to or smaller than a threshold edge signal intensity, and the threshold edge signal intensity is determined on the basis of a maximum edge signal intensity in the distance distribution of the edge signal intensity. Further, the threshold edge signal intensity may be a half of the maximum edge signal intensity.

Alternatively, the detectable edge distance calculation element may determine the detectable edge distance, at which a degree of change of the edge signal intensity with respect to the distance is equal to or larger than a threshold degree of change of the edge signal intensity, and the threshold degree of change of the edge signal intensity is preliminarily determined and memorized in the detectable edge distance calculation element.

Alternatively, the degree of reliability of detection of the traffic lane line is proportional to the length of the detectable edge distance.

Alternatively, the processor further includes: a driving support element for performing a driving support on the basis of the degree of reliability of detection of the traffic lane line determined by the detection reliability calculation element.

Alternatively, the traffic lane line detection element calculates the edge signal intensity in such a manner that the image of the road is differentiated along with a horizontal direction of the image in order to specify the edge of the traffic lane line.

Further, an image processor for an automotive vehicle includes: an imaging element for imaging a road, on which the automotive vehicle is disposed; a traffic lane line detection element for detecting a position of a traffic lane line on the road by determining an edge of the traffic lane line on the basis of an image of the road; a distance distribution calculation element for calculating a distance distribution of a number of edge detection times of the traffic lane line detected by the traffic lane line detection element, the distance distribution corresponding to a distance between the traffic lane line and the imaging element; and a detection reliability calculation element for calculating a degree of reliability of detection of the traffic lane line on the basis of the distance distribution of the number of edge detection times.

In the above processor, the degree of reliability of detection of the traffic lane line is determined on the basis of the distance distribution of the number of edge detection times. Thus, the reduction of the reliability caused by a factor other than weather in addition to the weather factor can be detected.

Alternatively, the detection reliability calculation element may include a detectable edge distance calculation element for calculating a detectable edge distance between the traffic lane line and the imaging element. The detectable edge distance is defined as a distance, at which the number of edge detection times in the distance distribution shows a certain change. The detection reliability calculation element determines the degree of reliability of detection of the traffic lane line on the basis of a length of the detectable edge distance.

Alternatively, the detectable edge distance calculation element may determine the detectable edge distance, at which the number of edge detection times is equal to or smaller than a threshold number of edge detection times, and the threshold number of edge detection times is determined on the basis of a maximum number of edge detection times in the distance distribution of the number of edge detection times.

Alternatively, the detectable edge distance calculation element may determine the detectable edge distance, at which a degree of change of the number of edge detection times with respect to the distance is equal to or larger than a threshold degree of change of the number of edge detection times, and the threshold degree of change of the number of edge detection times is preliminarily determined and memorized in the detectable edge distance calculation element.

Alternatively, the traffic lane line detection element may detect the edge of the traffic lane line in such a manner that the image of the road is differentiated along with a horizontal direction of the image in order to specify the edge of the traffic lane line.

Alternatively, the traffic lane line detection element may count the number of edge detection times of the traffic lane line by detecting the edge of the traffic lane line during a predetermined period.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. An image processor for an automotive vehicle comprising:
    an imaging element for capturing an image of a road, on which the automotive vehicle is located;
    a traffic lane line detection element for detecting a position of a traffic lane line on the road by determining an edge of the traffic lane line on the basis of the image of the road;
    a distance distribution calculation element for calculating a distance distribution of an edge intensity of the traffic lane line, the distance distribution corresponding to a distance to the traffic lane line from the imaging element; and
    a detection reliability calculation element for calculating a degree of reliability of detection of the traffic lane line on the basis of the distance distribution of the edge intensity of the traffic lane; wherein
    the detection reliability calculation element includes a detectable edge distance calculation element for calculating a detectable edge distance to the traffic lane line from the imaging element;
    the detectable edge distance is defined as a distance, at which the edge intensity in the distance distribution shows a certain change;
    the detection reliability calculation element determines the degree of reliability of detection of the traffic lane line on the basis of a length of the detectable edge distance;
    the detectable edge distance calculation element determines the detectable edge distance, at which the edge intensity is equal to or smaller than a threshold edge intensity; and
    the threshold edge intensity is determined on the basis of a maximum edge intensity in the distance distribution of the edge intensity.

2. The image processor according to claim 1, wherein
    the threshold edge intensity is a half of the maximum edge intensity.

3. The image processor according to claim 1, wherein
    the degree of reliability of detection of the traffic lane line is proportional to the length of the detectable edge distance.

4. The image processor according to claim 1, further comprising:
    a driving support element for performing a driving support on the basis of the degree of reliability of detection of the traffic lane line determined by the detection reliability calculation element.

5. The image processor according to claim 1, wherein
    the traffic lane line detection element calculates the edge intensity in such a manner that the image of the road is differentiated along with a horizontal direction of the image in order to specify the edge of the traffic lane line.

6. An image processor for an automotive vehicle comprising:
    an imaging element for capturing an image of a road, on which the automotive vehicle is located;
    a traffic lane line detection element for detecting a position of a traffic lane line on the road by determining an edge of the traffic lane line on the basis of the image of the road;
    a distance distribution calculation element for calculating a distance distribution of an edge intensity of the traffic lane line, the distance distribution corresponding to a distance to the traffic lane line from the imaging element; and
    a detection reliability calculation element for calculating a degree of reliability of detection of the traffic lane line on the basis of the distance distribution of the edge intensity of the traffic lane line; wherein
    the detection reliability calculation element includes a detectable edge distance calculation element for calculating a detectable edge distance to the traffic lane line from the imaging element;
    the detectable edge distance is defined as a distance, at which the edge intensity in the distance distribution shows a certain change;
    the detection reliability calculation element determines the degree of reliability of detection of the traffic lane line on the basis of a length of the detectable edge distance;
    the detectable edge distance calculation element determines the detectable edge distance, at which a degree of change of the edge intensity with respect to the distance is equal to or larger than a threshold degree of change of the edge intensity, and
    the threshold degree of change of the edge intensity is preliminarily determined and memorized in the detectable edge distance calculation element.

7. An image processor for an automotive vehicle comprising:
    an imaging element for imaging a road, on which the automotive vehicle is disposed;
    a traffic lane line detection element for detecting a position of a traffic lane line on the road by determining an edge of the traffic lane line on the basis of an image of the road;
    a distance distribution calculation element for calculating a distance distribution of a number of edge detection times of the traffic lane line detected by the traffic lane line detection element, the distance distribution corresponding to a distance to the traffic lane line from the imaging element; and a detection reliability calculation element for calculating a degree of reliability of detection of the traffic lane line on the basis of the distance distribution of the number of edge detection times; wherein the detection reliability calculation element includes a detectable edge distance calculation element for calculating a detectable edge distance to the traffic lane line from the imaging element;

the detectable edge distance is defined as a distance, at which the number of edge detection times in the distance distribution shows a certain change;

the detection reliability calculation element determines the degree of reliability of detection of the traffic lane line on the basis of a length of the detectable edge distance;

the detectable edge distance calculation element determines the detectable edge distance, at which the number of edge detection times is equal to or smaller than a threshold number of edge detection times; and the threshold number of edge detection times is determined on the basis of a maximum number of edge detection times in the distance distribution of the number of edge detection times.

8. The image processor according to claim 7, wherein the threshold number of edge detection times is a half of the maximum number of edge detection times.

9. The image processor according to claim 7, wherein the degree of reliability of detection of the traffic lane line is proportional to the length of the detectable edge distance.

10. The image processor according to claim 7, further comprising:

a driving support element for performing a driving support on the basis of the degree of reliability of detection of the traffic lane line determined by the detection reliability calculation element.

11. The image processor according to claim 7, wherein the traffic lane line detection element detects the edge of the traffic lane line in such a manner that the image of the road is differentiated along with a horizontal direction of the image in order to specify the edge of the traffic lane line.

12. The image processor according to claim 7, wherein the traffic lane line detection element counts the number of edge detection times of the traffic lane line by detecting the edge of the traffic lane line during a predetermined period.

13. An image processor for an automotive vehicle comprising:

an imaging element for imaging a road, on which the automotive vehicle is disposed;

a traffic lane line detection element for detecting a position of a traffic lane line on the road by determining an edge of the traffic lane line on the basis of an image of the road;

a distance distribution calculation element for calculating a distance distribution of a number of edge detection times of the traffic lane line detected by the traffic lane line detection element, the distance distribution corresponding to a distance to the traffic lane line from the imaging element; and a detection reliability calculation element for calculating a degree of reliability of detection of the traffic lane line on the basis of the distance distribution of the number of edge detection times; wherein the detection reliability calculation element includes a detectable edge distance calculation element for calculating a detectable edge distance to the traffic lane line from the imaging element;

the detectable edge distance is defined as a distance, at which the number of edge detection times in the distance distribution shows a certain change;

the detection reliability calculation element determines the degree of reliability of detection of the traffic lane line on the basis of a length of the detectable edge distance;

the detectable edge distance calculation element determines the detectable edge distance, at which a degree of change of the number of edge detection times with respect to the distance is equal to or larger than a threshold degree of change of the number of edge detection times, and the threshold degree of change of the number of edge detection times is preliminarily determined and memorized in the detectable edge distance calculation element.

* * * * *

UNITED STATES PATENT AND TRADEMARK OFFICE
CERTIFICATE OF CORRECTION

PATENT NO. : 7,646,890 B2
APPLICATION NO. : 11/402591
DATED : January 12, 2010
INVENTOR(S) : Kobayashi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 945 days.

Signed and Sealed this

Sixteenth Day of November, 2010

David J. Kappos
*Director of the United States Patent and Trademark Office*